United States Patent [19] | [11] 4,162,978
Lidman et al. | [45] Jul. 31, 1979

[54] SEPARATOR

[75] Inventors: Sten M. Lidman, Tumba, Sweden; Engelbert Baum, Vienna, Austria

[73] Assignee: Alfa-Laval AB, Tumba, Sweden

[21] Appl. No.: 942,789

[22] Filed: Sep. 15, 1978

[30] Foreign Application Priority Data

Sep. 19, 1977 [SE] Sweden ............................ 7410444

[51] Int. Cl.$^2$ ............................................ B01D 29/36

[52] U.S. Cl. .................................. 210/213; 210/405; 210/415

[58] Field of Search ......... 210/213, 377, 405, 413–415

[56] References Cited

U.S. PATENT DOCUMENTS

| | | | |
|---|---|---|---|
| 2,899,069 | 8/1959 | Sandison | 210/405 |
| 3,093,579 | 6/1963 | Schmidt | 210/405 X |
| 3,419,148 | 12/1968 | Toshioniwa et al. | 210/213 |
| 3,902,962 | 9/1975 | Reinhall | 210/413 X |
| 4,024,062 | 5/1977 | Holthuis | 210/415 X |

*Primary Examiner*—Willam A. Cuchlinski, Jr.
*Attorney, Agent, or Firm*—Cyrus S. Hapgood

[57] ABSTRACT

A stationary chamber having a perforated peripheral wall contains an axial rotor having rubber-like radial carrier blades which, as the rotor rotates, are indented at their outer edges by guide means having helical turns extending along said peripheral wall. A passage allows ambient gas to enter the chamber so that the rotor's action on a liquid-solids mixture entering a first part of the chamber maintains a free liquid surface therein. The carrier blades and rotor coact with the helical turns to carry a liquid-bearing cake of the solids through the free liquid surface and thence through a second part of the chamber to a solids outlet, during draining of liquid from the cake through the perforated peripheral wall.

8 Claims, 2 Drawing Figures

SEPARATOR

Figure 1:
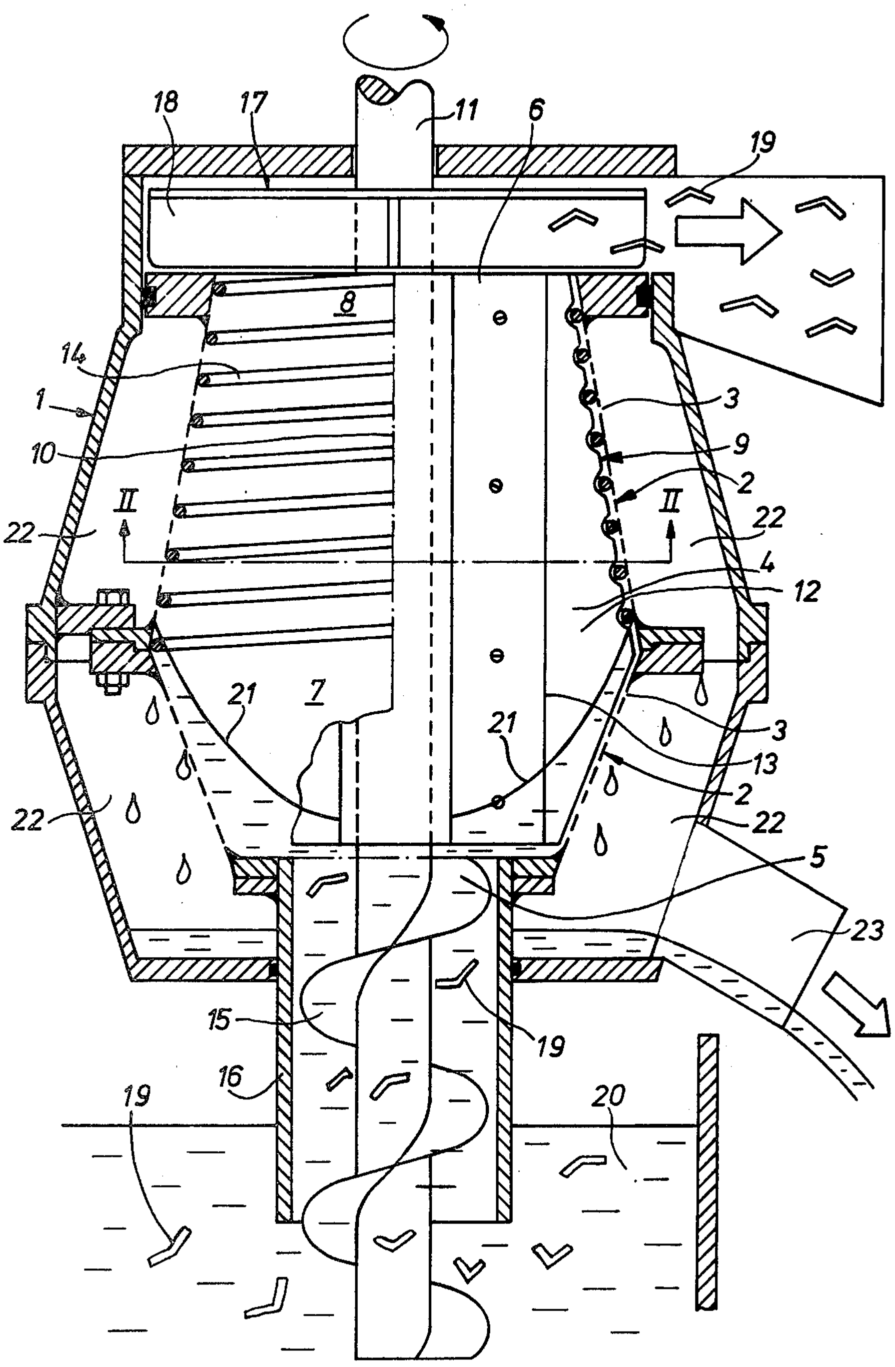

The present invention relates to an arrangement for separating the solid constituents from a mixture of liquid and solids and comprising stationary means forming a substantially rotation-symmetrical chamber having at one end an inlet for the mixture, the peripheral wall of the chamber having holes for draining liquid from the chamber, the other end of the chamber having an outlet for discharging solid constituents. A rotor in the chamber is rotatable around the central axis of the chamber, and means extending helically along the peripheral wall of the chamber form helical turns between which the solid constituents are displaced by the rotor action towards the outlet.

An arrangement of the kind described above is disclosed in the Swedish Laid Open print No. 393,539, especially at its page 2, lines 18–20, and its claim 7. This prior arrangement has a chamber containing a rotor with a substantially cylindrical outer surface. The wall of the chamber is provided with a rim which extends helically towards an outlet from the chamber. The rotor forms with the wall of the chamber and the rim a narrow space which extends helically towards the outlet. The mixture of liquid and solid constituents to be separated is supplied to one end of the space. When the rotor rotates, it causes the mixture to flow along the helical space, whereby liquid is drained by the centrifugal force through holes in the wall of the chamber, and the solid constituents together with the remaining liquid move along the helical space towards the outlet.

With this prior arrangement, the liquid of the mixture cannot form in the chamber a free liquid surface through which the solid constituents can be carried upward and, during further draining, be carried toward the outlet. Therefore, the solid constituents will leave the outlet suspended in the liquid (i.e., together with a relatively large part of liquid).

The principal object of the invention is to provide an arrangement of the aforementioned kind in which the solid constituents leave the outlet in a substantially drier state than they can do with the prior arrangement.

This object is attained according to the invention by providing the rotor with carrier means arranged to engage the mixture introduced into the chamber and bring it into rotation along the perforated peripheral wall of the chamber, and by forming a passage which allows ambient gaseous medium to enter the chamber so that by the action of the rotor on the mixture, a free liquid surface of the mixture is maintained in a first part of the chamber, the carrier means of the rotor coacting with the helical means to carry with it a liquid-bearing cake of the solid constituents through the formed liquid surface and thence through the further part of the chamber to the outlet, during further draining of the cake.

Through the carrier means, which engage the mixture, the latter is effectively brought into rotation along the wall of the chamber so that the free liquid surface is formed. To transfer solid constituents through the liquid surface from the "wet" first part of the chamber to the "dry" further part of the chamber, it is necessary that the mixture at the end of the first part of the chamber be so thickened that the solid constituents begin to form clods so that they can be caught and carried by the carrier means. The helical means in the further part of the chamber provide a guided transport of solid constituents out of the chamber. By changing the pitch of the helical means, the time of retention of the solid particles in the chamber can be changed.

According to a preferred embodiment of the invention, the first part of the chamber widens conically towards the further part of the chamber. This promotes the transport of the mixture in the direction towards the further part of the chamber. Preferably, the further part of the chamber converges conically towards the outlet. This assures that the liquid surface will form within the chamber, as the centrifugal force prevents the liquid in the mixture from moving radially inward toward the outlet.

In the preferred embodiment of the invention, the rotor is provided with means for feeding the mixture to the chamber, such means extending out through the inlet and having helical surfaces for the feeding. The separator of the invention is intended to work so that when the mixture enters the chamber, the rotor transports the liquid and the solid constituents further through the chamber. However, if the chamber is charged with a flow which is too large, the chamber will be flooded and the separation result will be impaired. If, on the contrary, the flow is too small, the separation result is not influenced. The means for feeding mixture to the chamber is a simple device for insuring that the mixture is supplied to the chamber at a predetermined flow rate suitable for the arrangement.

According to a further feature of the invention, the rotor has means for throwing out the solid constituents which pass through the outlet. Thus, a simple means is obtained to remove the solid constituents from the separator.

Figure 2:
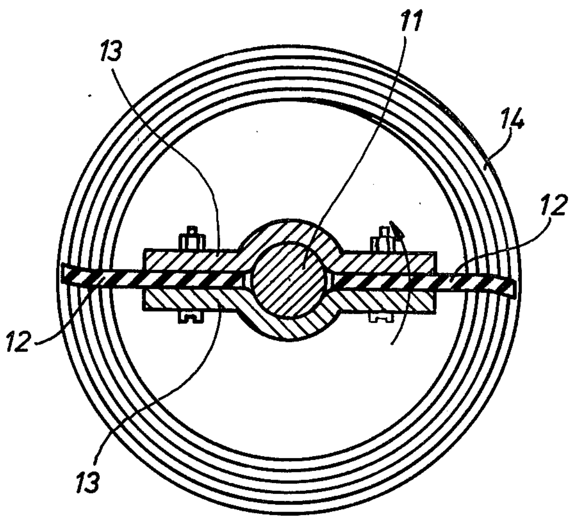

An embodiment of the arrangement according to the invention is described below in connection with the accompanying drawings, in which FIG. 1, is a longitudinal sectional view of the arrangement with parts of the rotor cut away, and FIG. 2 is a sectional view on line II—II in FIG. 1.

The illustrated embodiment of the new separator comprises a stationary housing 1 containing a stationary rotation-symmetrical wall 2 provided with holes 3. The wall 2 encloses a chamber 4 which at one end has an inlet 5 and at its other end an outlet 6. At its inlet end the chamber 4 has a first part 7 which widens conically towards an upper part 8 of the chamber, and the part 8 conically converges towards the outlet 6. A rotor 9 is arranged in the chamber 4. The rotor is rotatable around the central axis 10 of the chamber and comprises a shaft 11 on which two blades 12 of rubber are fastened by a pair of plate elements 13. The blades 12 extend in the axial direction along the entire chamber 4 and in the radial direction all the way to the wall 2.

A rim 14 is fastened to the wall 2 of the upper part 8 of the chamber. The rim 14 extends helically towards the outlet 6. The shaft 11 extends out of the chamber 4 through the inlet 5, where the shaft has helical means 15 which, in cooperation with a surrounding stationary tube 16, serves to feed a mixture to be separated into the chamber 4.

At the outlet 6, a wheel 17 with radial vanes 18 is arranged on the shaft 11. This wheel serves to throw out solid constituents which have been separated from the mixture.

The mixture, which is to be separated into solid constituents 19 and liquid, is supplied from a container 20. The helical means 15 feeds the mixture up to the first part 7 of the chamber, where the blades 12 engage the mixture and cause it to rotate along the perforated wall 2. The centrifugal force will force liquid out through the holes 3 in the wall 2; and the mixture, on being thus thickened, will move axially towards the upper part 8 of the chamber. A free liquid surface 21, which constitutes the border surface between the liquid in the mixture and the ambient gaseous medium which enters chamber 4 between the vanes 18, will form in the chamber 4. The arrangement is suitably such that this liquid surface reaches the wall 2 approximately at the transition zone between the lower part 7 and the upper part 8 of the chamber. Where the liquid surface 21 reaches the wall 2, the thickened mixture comprises a liquid-bearing cake of solid constituents. This cake of solid constituents is carried up through the liquid surface to the upper part 8 of the chamber where the blades 12, during further draining of the solid constituents under influence of the centrifugal force, carry these solids between the helical turns of rim 14 towards the outlet 6, where the vanes 18 engage the solid constituents and throw them out of the separator.

The liquid which forces its way out through the holes 3 in the wall 2 of the lower and upper parts 7–8 of the chamber is led through a space 22 between the housing 1 and the wall 2 to an outlet 23.

The above-described arrangement has proved to give an excellent result in separating liquid manure into liquid and solid manure constituents. The solid constituents become so dry and porous through the separation that they can be composted without further drying.

The axis 10 of the chamber 4 can be arranged horizontally, instead of vertically, without departing from the scope of the invention.

It will be understood that the peripheral wall 3, which forms a perforated surface of revolution around rotor 11, closely surrounds the helical turns 14 which indent the outer edges of the rubber blades 12. Of course, the direction of the helical turns 14 and the direction of rotation of rotor 11 are so correlated that the rotor action displaces solids upwardly along the helical path between the turns 14.

We claim:

1. In a separator for separating solid constituents from a mixture of liquid and solids, the combination of means forming a chamber defined substantially by a surface of revolution, the chamber having a central axis and being provided at one end with an inlet for supplying the mixture to a first part of the chamber, the peripheral wall of the chamber being perforated for draining liquid from the chamber, the other end of the chamber having an outlet for discharging solid constituents from a second part of the chamber, a rotor mounted in the chamber for rotation around said central axis, guide means having turns extending helically along said peripheral wall and forming therewith a helical path for leading solid constituents toward said outlet, and carrier means on the rotor for engaging mixture from said inlet and causing the mixture to rotate along said perforated peripheral wall, there being a passage allowing ambient gaseous medium to enter the chamber so that the rotor's action on the mixture maintains a free liquid surface in said first part of the chamber, the carrier means and rotor coacting with the guide means to carry a liquid-bearing cake of the solid constituents through said free liquid surface and thence through said second part of the chamber to said outlet, during draining of said cake.

2. The combination of claim 1, in which said first part of the chamber widens conically toward said second part of the chamber.

3. The combination of claim 1, in which said second part of the chamber converges conically toward said outlet.

4. The combination of claim 1, comprising also means on the rotor for feeding the mixture to the chamber, said feeding means extending out through said inlet and having helical surfaces for said feeding.

5. The combination of claim 1, comprising also means on the rotor for throwing out the solid constituents discharged from said outlet.

6. The combination of claim 1, in which said central axis is substantially vertical.

7. The combination of claim 1, in which said carrier means include at least one blade extending radially from the rotor.

8. The combination of claim 7, in which said blade is made of rubber-like material which is indented by said helical turns.

* * * * *